United States Patent [19]
Sharp

[11] 4,037,210
[45] July 19, 1977

[54] COMPUTER-PERIPHERAL INTERFACE

[75] Inventor: Richard Stanton Sharp, Santa Barbara, Calif.

[73] Assignee: Burroughs Corporation, Detroit, Mich.

[21] Appl. No.: 653,497

[22] Filed: Jan. 29, 1976

Related U.S. Application Data

[63] Continuation of Ser. No. 392,861, Aug. 30, 1973, abandoned.

[51] Int. Cl.² ............................ G06F 3/00; G06F 15/16
[52] U.S. Cl. ..................................................... 364/900
[58] Field of Search ............................ 340/172.5; 445/1

[56] References Cited

U.S. PATENT DOCUMENTS

| | | | |
|---|---|---|---|
| 3,345,618 | 5/1964 | Threadgold | 340/172.5 |
| 3,566,363 | 2/1971 | Driscoll | 340/172.5 |
| 3,745,532 | 7/1973 | Erwin | 340/172.5 |
| 3,761,879 | 9/1973 | Brandsma | 340/172.5 |
| 3,787,818 | 1/1974 | Arnold et al. | 340/172.5 |
| 3,810,114 | 5/1974 | Yamada et al. | 340/172.5 |

*Primary Examiner*—Mark E. Nusbaum
*Attorney, Agent, or Firm*—Nathan Cass; Kevin R. Peterson; Edward J. Feeney, Jr.

[57] ABSTRACT

Disclosed is a computer system utilizing an interface unit for routing the information exchanged between processor units and memory units, in a temporal multiplex manner whereby the exclusive access of any one processor to any memory proceeds concurrently with the exclusive access of another processor to another memory. The system includes at least two independently operable processors and at least two independently addressable and separately operable memories, the latter being connected to the former through the interface unit.

4 Claims, 1 Drawing Figure

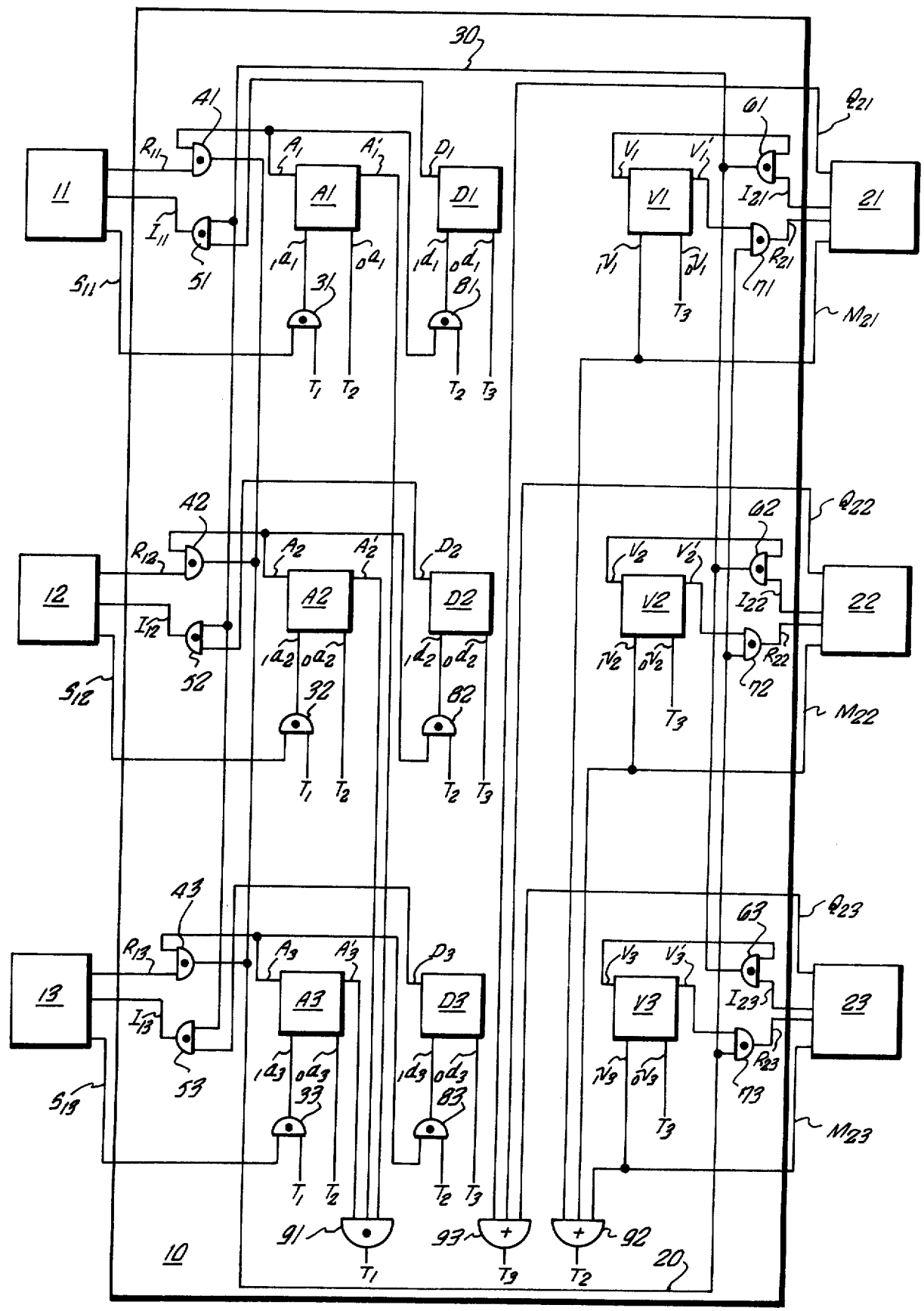

COMPUTER-PERIPHERAL INTERFACE

This is a continuation of application Ser. No. 392,861, filed Aug. 30, 1973 now abandoned.

BACKGROUND OF THE INVENTION

Computer technology has advanced to a point wherein hierarchical systems are quite common. Representative systems consist of modules such as processors, memories, multiplexers and peripheral units, not only represented by a variety of different types, but also with a wide selection of admixtures. Thus, in the same system, a plurality of processors may separately require and control communication with a number of memory units and other peripherals comprising different magnetic and paper tape units, disk and drum magnetic data storage units, and magnetic core stacks, and each may be burdended by constraints which makes its operation different from not only those of the others, but from the processors' as well. A well-known example is temporal operation, i.e., the "clock" rates of the memories are much slower than those of the processors and their time of response to a processor request for information greatly exceeds the time required for the latter to manipulate the information.

Processors in conventional computer systems operate sequentially, i.e., a processor requests access to data in a memory and awaits transfer thereof before submitting another request. However, in the case of plural processors and plural memories, a simple serial activity is economically intolerable, i.e., it is not feasible to deny the recognition of a request from one processor to an idle and available memory merely because another processor is engaged in a data transfer with another memory.

An approach to reducing the contention among independently operating processors in hierarchical systems has been based on the development of a parallelism in which different processors perform simultaneous accesses with different memories by means of intermediate crosspoint switching units. Such units provide independent, controllable interconnection paths between processors and memories, but the units are large and expensive. The present invention discloses a far simpler, though less comprehensive, means to provide concurrency rather than simultaneity in accesses.

SUMMARY OF THE INVENTION

The invention, then, in its preferred embodiment, comprises an interface unit capable of providing a degree of concurrency in accesses between a plurality of processor units and a plurality of memory units.

The interface unit includes two multi-lead busses, a transmit (write) bus and a receive (read) bus, to which all processors are connected in parallel and all memories are connected in parallel. The connections between the processors or memory units are selectively controllable by means of gating circuits. The interface unit operates in response to signals from processors which request memory access, and signals from memory units which indicate firstly, that access is available and secondly, that information transfer is completed. The signals trigger memory elements (flip-flops) whose outputs effectuate connection via the buses such that, while a specific processor is awaiting an information response from a specific memory, an additional communication path may be set up within the interface unit for the purpose of transferring information between another processor and the other memories, thereby providing concurrency of transfers rather than waiting until the completion of the information transfer between the prior processor-memory combination. Specifically, the interface unit includes two flip-flops associated with each processor, to control its connection to each of the two buses, and one flip-flop associated with each memory unit, to control its connection to either bus.

DESCRIPTION OF THE DRAWING

The FIGURE shows the interface unit of the present invention in block diagram form as associated with three processor units and three memory units.

DESCRIPTION OF THE PREFERRED EMBODIMENT

Referring to the drawing, it is seen that a typical application of interface unit 10 is to a plurality (here, three) of processor units (PU) 11, 12, 13 and to a plurality (also three) of memory units (MU) 21, 22, 23.

Although the inventive concept is quite applicable to various systems of representing information, it will be presented herein with regard to digital representation in a binary system. By this is meant a system in which signals are bivalued, alternating between a pair of specific voltage levels, as, for instance, +10 volts and zero volts (ground potential) present on a line. Herein, the voltage level of +10 volts may be considered to represent the binary value 1, and the ground level to represent the binary value 0.

The circuits of interface unit 10 are used to perform various logical operations such as storage, AND and OR. In the FIGURE, the circuits are depicted in the form of rectangles to represent storage (memory) elements, and D-shapes including a dot sign to represent an AND gate, or including a plus sign to represent an OR gate.

The memory elements are electronic devices (flip-flops) having two possible steady state conditions. One of these conditions is referred to as "set" and the other condition is referred to as "reset;" when a flip-flop is described as being set, it will be understood to be storing a bit having the value 1, and when it is described as reset, it will be understood to be storing a bit having the value 0. The flip-flops are characterized by two inputs, only one of which may have an actuating signal at a time, and two outputs having complementary voltages.

The nomenclature selected employs combinations of letters and numbers for designating the flip-flops and their input and output signals. The flip-flops themselves are designated by combinations of upper case letters and numbers; thus, flip-flops A1, V2, etc. One output signal of the flip-flop is characterized by the corresponding upper case letters with the associated number shown as a subscript; thus, signals $A_1$, $V_2$, etc. In order to distinguish the complementary output of the flip-flop, it is accompanied by an affixed prime; thus, signals $A_1'$, $V_2'$, etc. It will be understood that the output signals partake of the aforementioned pair of voltage levels (such as +10 volts and 0 volts) on a line, and, when the unprimed signal output of a flip-flop is high in voltage and the primed signal output is low in voltage, the flip-flop is set, while, for the reverse condition, the flip-flop is reset; thus, flip-flop A1 is set when signal $A_1$ is at +10 volts and signal $A_1'$ is at 0 volts.

The input signals to the flip-flops are designated by corresponding lower case letters with the associated number shown as a subscript. The input signal for rendering the flip-flop set is designated by a subscript 1 prefixing the lower case letter; thus, signals $_1a_1$, $_1v_2$, etc. The input signal for rendering the flip-flop reset is designated by a subscript O prefixing the lower case letter; thus, signals $_0a_1$, $_0v_2$, etc.

From the above, it is apparent that the embodiment chosen to teach the present invention will make use of the R-S flip-flop, and also chosen are the logical connectives AND and (inclusive) OR. However, it should be clearly understood that any of the memory elements and connectives known to logic designers, such as described in the book, "Logical Design of Digital Computers" by M. Phister Jr., Wiley and Sons, Inc., N.Y., 1958, pages 53 through 56 and 121 through 132, may also comprise suitable choices.

For the system disclosed herein, a memory access transaction between a processor and a memory unit involves two phases: a request phase followed by a response phase. During the request phase, a processor issues a memory access request signal, a memory address comprising both a memory unit designation and a word address identifying a location within the selected memory, command signals describing the type of operation desired, and, for a memory write operation, signals representing the information to be stored. During the subsequent response phase, the selected memory unit returns status or timing signals and signals representing the information content of the addressed location. Such a memory access operation is quite conventional in computer systems, although its details vary among systems and, if an example is desired, reference may be made to Kotak et al., U.S. Pat. No. 3,810,110, although, actually, the present invention probably would find best accommodation in the Burroughs B6700 computer (see Wollum et. al., U.S. Pat. No. 3,609,700) marketed by the Burroughs Corporation, Detroit, Mich.

Referring back to the drawing, the access request signals from PUs 11, 12, 13, designated as $S_{11}$, $S_{12}$, $S_{13}$, respectively, are connected as inputs to AND gates 31, 32, 33, respectively. The other input to each of gates 31, 32, 33, signal $T_1$, is generated by AND gate 91 when all of transmit flip-flops A1, A2, A3 are reset; that is, when signals $A_1'$, $A_2'$, $A_3'$ are all at the +10 volt level. The outputs of gates 31, 32, 33 respectively energize set inputs $_1a_1$, $_1a_2$, $_1a_3$ of flip-flops A1, A2, A3.

To simplify this description, all of the signals occurring in the request phase, (other than the access request signals) from PUs 11, 12, 13 are designated as signals R $R_{11}$, $R_{12}$, $R_{13}$, respectively. Each composite signal denotes a plurality of signals, as aforementioned. As depicted signals, $R_{11}$, $R_{12}$, $R_{13}$ are each connected as one input to corresponding transmit AND gates 41, 42, 43. The other inputs to gates 41, 42, 43 are set outputs $A_1$, $A_2$, $A_3$ of flip-flops A1, A2, A3, respectively. These outputs are also connected to one input of AND gates 81, 82, 83, respectively. The other input to gates 81, 82, 83 is signal $T_2$, to be explained. The outputs of gates 81, 82, 83 respectively energize set inputs $_1d_1$, $_1d_2$, $_1d_3$ of flip-flops D1, D2, D3. Signal T2 also triggers reset inputs $_0a_1$, $_0a_2$, $_0a_3$ of flip-flops A1, A2, A3.

The outputs of AND gates 41, 42, 43 individually energize the multiple-lead write bus 20. That is, the outputs of particular corresponding individual gates 41, 42, 43 are connected together, in a configuration well known as a wired-OR, to a lead set of write bus 20. Write bus 20 is connected as one input to AND gates 71, 72, 73. The other inputs to gates 71, 72, 73 are respectively the reset outputs $V_1'$, $V_2'$, $V_3'$ of flip-flops V1, V2, V3. The outputs of gates 71, 72, 73, signals $R_{21}$, $R_{22}$, $R_{23}$, are composites and connect to MUs 21, 22, 23, respectively.

As is conventional in computer systems, each memory unit is assigned a unique designation and is responsive to a memory cycle request having an address containing its particular unit designation. When a memory unit detects its code and a request for a memory operation, and if it is free to execute the requested operation, then it issues a ready signal indicating the beginning of the memory cycle and the acceptance of the information accompanying the request. Accordingly, MUs 21, 22, 23 each provide a corresponding ready signal $M_{21}$, $M_{22}$, $M_{23}$ when it recognizes its unique code and begins a memory operation. If all of the flip-flops V1, V2, V3 are reset, then MUs 21, 22, 23 will each receive signals from write bus 20 (through gates 71, 72, 73), but because the memory unit codes are unique, no more than one of them can have its cycle initiated, and only that particular memory unit will issue a ready signal.

Ready signals $M_{21}$, $M_{22}$, $M_{23}$ are respectively connected to set inputs $_1v_1$, $_1v_2$, $_1v_3$ of flip-flops V1, V2, V3. Additionally, these signals are combined in OR gate 92. The output of OR gate 92, signal $T_2$, thus indicates the beginning of a memory cycle in any of MUs 21, 22, 23.

After a memory unit is triggered to perform an operation, the operation proceeds internally. When information is read from the addressed location, the memory unit transmits a plurality of signals representing the information together with a signal indicating the presence of information signals. The information signals designated respectively as signals $I_{21}$, $I_{22}$, $I_{23}$ are composites and are each connected as one input to corresponding AND gates 61, 62, 63, respectively. The other inputs to gates 61, 62, 63 are set outputs $V_1$, $V_2$, $V_3$ of flip-flops V1, V2, V3.

The outputs of AND gates 61, 62, 63 are connected in a wired-OR configuration and each energize a lead set of multiple-lead read bus 30. Read bus 30 is connected as one input to AND gates 51, 52, 53, the other inputs to which are respectively set output $D_1$, $D_2$, $D_3$ of flip-flops D1, D2, D3. Gate 51 routes the signals on read bus 30 to PU 11, gate 52 routes the signals on read bus 30 to PU 12, and gate 53 routes the signals on read bus 30 to PU 13.

Referring again to the memory units, signals $Q_{21}$, $Q_{22}$, $Q_{23}$ are generated by MUs 21, 22, 23, respectively, to indicate the presence of signals $I_{21}$, $I_{22}$, $I_{23}$ and to signify the completion of the memory operation. Signals $Q_{21}$, $Q_{22}$, $Q_{23}$ are combined in OR gate 93, whose output, $T_3$ thus indicates the consummation of memory operation in any of MUs 21, 22, 23. Signal $T_3$ is connected to the reset inputs $_0v_1$, $_0v_2$, $_0v_3$ of flip-flops V1, V2, V3, and, additionally, is connected to inputs $_0d_1$, $_0d_2$, $_0d_3$ of flip-flops D1, D2, D3.

As a consequence of the aboe arrangement of components and connections, and presuming that all flip-flops are initially reset, with regard to PU 11, for instance, when it requires stored information, it emits signal $S_{11}$, thereby indicating that it desires access to a memory unit; for instance, the memory unit code included in signals $R_{11}$ may designate MU 22. Since flip-flops A1, A2, A3 are all reset, signal $S_{11}$ occurs coincidently with signal $T_1$, and gate 31 is opened; this triggers flip-flop A1 to the set conditions; this activity opens gate 41, passing signals $R_{11}$ to write bus 20 and simultaneously eliminates signal $T_1$. Accordingly, request signals $S_{12}$ or $S_{13}$, if generated by CPUs 12, 13, respectively, will be blocked out by gates 42, 43.

When addressed MU 22 is free to comply with the request (from PU 11), it will provide ready signal $M_{22}$ which will generate signal $T_2$; this signal sets flip-flop D1 only, and resets flip-flop A1, thereby opening gate 51 and closing gate 41, disconnecting write bus 20 and connecting read bus 30 (on which the information signals $I_{21}$ will subsequently appear) to CPU 11. The reset condition of flip-flop A1 now makes write bus 20 available to either CPU 12 or 13.

The above activity indicates that CPU 11 request signal $S_{11}$ causes interface unit 10 to effectuate seizure of write bus 20 by CPU 11, then seizure of read bus 30 by CPU 11 simultaneously with its release of write bus 30 so that the latter is available to CPU 12 or 13.

When the memory units receive address signals $R_{11}$ emitted by CPU 11 and transmitted over write bus 20 (the reset condition of flip-flops V1, V2, V3 and the resultant +10 v. level of signals $V_1'$, $V_2'$, $V_3'$ opens gates 71, 72, 73), their address recognition systems (not shown) compares these signals with their designated addresses. The MU 22 comparison will be successful (the desired address is contained within its store), and if MU 22 is not engaged in complying with a prior request, it emits signals $M_{22}$, thereby generating signal $T_2$ and connecting read bus 30 to CPU 11. Simultaneously, signal $M_{22}$ sets flip-flops V2, closing gate 72 and opening gate 62, thereby connecting signals $I_{22}$ to read bus 30.

Completion of memory operation is signified by generation of signal $Q_{22}$ which feeds through OR gate 93 and produces signal $T_3$. Signal $T_3$ resets flip-flops D1, D2, D3, V1, V2, V3, thereby returning interface unit 10 to an idle condition to await a next request, unless, of course, PU 12 or 13 has begun an overlapping operation, in which case another memory access will occur.

In summary, it is apparent that interface unit 10 provides an information routing path (trunk) between a processor unit and a memory unit and provides for an additional such assignment between another processor unit and another memory unit before the transfer of information between the first PU-MU pair has been completed.

It is again remarked that the invention has been described with regard to specific components and connections. Since the invention may quite easily be adapted to other configurations without a substantial change in essence, it follows that such adaptations are within its scope. Thus, extensions to more than three processor or memory units or to a system which involves unequal numbers of these units, have been relegated to those skilled in the art since, to a great extent, those are determined by the preferred data handling requirements. Briefly, the present description should be considered exemplary for teaching those skilled in the computer arts and not constrained to the showing herein or in the reference.

What is claimed is:

1. In association with a plurality of processing units and a plurality of peripheral units, each of said processing units including means for emitting an access-request signal and the address of a particular peripheral unit and each of said peripheral units including means for emitting a ready-to-transmit signal in response to receipt of an address corresponding thereto followed by information signals and a transmit-complete signal, an interface unit comprising:

a read bus for transmitting signals from a selected processing unit to one or more of said peripheral units;

a write bus for transmitting signals from a selected peripheral unit to a selected processing unit;

first means for generating a not-busy signal only when said write bus is not in use and regardless of whether any use is currently being made of said read bus, said first means further including means jointly responsive to said not-busy signal and to an access-request signal from a selected processing unit for connecting only said selected processing unit to said write bus for transmission of a peripheral address provided thereby;

second means for connecting each peripheral unit which is not in use to said write bus for receiving the peripheral address transmitted by a selected processing unit, said second means being responsive to a ready-to-transmit signal from the selected peripheral unit corresponding to said peripheral address for disconnecting said selected processing unit and only said selected peripheral unit from said write bus and for connecting only said selected peripheral unit and only said selected processing unit to said read bus, thereby providing for transmitting information signals from said selected peripheral unit to said selected processing unit along said read bus, while freeing said write bus for connection thereto of another processing unit for transmission of an access-response-signal provided thereby to the peripheral units remaining connected to said write bus; and third means responsive to a transmit-complete signal from said selected peripheral unit for disconnecting said selected processing unit and said selected peripheral unit from said read bus and for re-connecting said selected peripheral unit to said write bus.

2. The invention in accordance with claim 1, wherein the particular processing unit which is selected to be connected to said write bus by said first means is the one which presents an access-request signal when the write bus is not in use.

3. The invention in accordance with claim 1, wherein said first means includes first and second flip-flops for each processing unit and associated logic circuitry for respectively controlling the connection of the processing units to said write and read buses in response to said not-busy, ready-to-transmit and transmit-complete signals, and wherein said second means includes a flip-flop for each peripheral unit and associated logic circuitry for respectively controlling the connection of the peripheral units to said write and read buses in response to said ready-to-transmit and transmit-complete signals.

4. The invention in accordance with claim 3,
wherein each first flip-flop of said first means controls the connection of its respective processing unit to said write bus, each first flip-flop being switched by the associated logic circuitry from an initial state to a write-bus-connecting-state in response to an access-request signal from its respective processing unit being provided when said not-busy signal is also present, and being switched back to its initial state by the associated logic circuitry in response to a ready-to-transmit signal;

wherein each second flip-flop of said first means control the connection of its respective processing unit to said read bus, each second flip-flop being switched by the associated logic circuitry from an initial state to a read-bus-connecting-state in response to a ready-to-transmit signal occurring when its respective first flip-flop is in a write-bus-connecting-state and being switched back to its initial state by the associated logic circuitry in response to a transmit-complete signal; and wherein each flip-flop of said second means controls the connection of its respective peripheral unit to said write and read buses, each flip-flop of said second means being switched by the associated logic circuitry from a write-bus-connecting-state to a read-bus-connecting-state in response to a ready-to-transmit signal from its respective peripheral unit and being switched from a read-bus-connecting-state to a write-bus-connecting-state by the associated logic circuitry in response to a transmit-complete signal.

* * * * *